Figure 1:
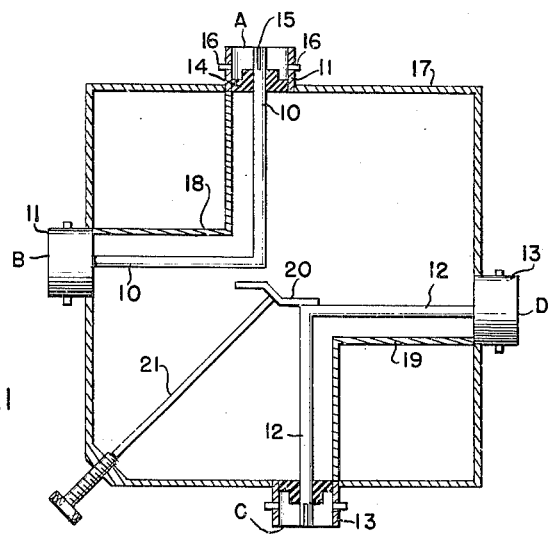

Nov. 1, 1949

D. F. BOWMAN 2,486,818

WAVE-SIGNAL DIRECTIONAL COUPLER

Filed Aug. 30, 1946

*INVENTOR.*
DAVID F. BOWMAN
BY Harry C. Page
ATTORNEY

Patented Nov. 1, 1949

2,486,818

UNITED STATES PATENT OFFICE 2,486,818

WAVE-SIGNAL DIRECTIONAL COUPLER

David F. Bowman, Bayside, N. Y., assignor to Hazeltine Research, Inc., Chicago, Ill., a corporation of Illinois Application August 30, 1946, Serial No. 694,115

8 Claims. (Cl. 178—44)

The present invention relates to wave-signal directional couplers and, particularly, to such couplers utilized with transmission lines.

It frequently is desirable to couple wave-signal energy from one transmission line into a second such line, the direction of energy flow in the second line being selectively dependent upon the direction of energy flow in the first line. A system of two or more transmission lines having such directional coupling therebetween is commonly called a "directional coupler." For certain applications, it is of paramount interest that the directional coupler employ a simple, inexpensive and compact construction.

A form of directional coupler heretofore proposed and one adapted to be constructed as a small compact unit, includes a short loop of wire inserted into the electromagnetic field of a coaxial transmission line to provide both magnetic and electric coupling with the inner conductor of the line. This loop is terminated at its remote end in a resistor having a value approximately equal to the characteristic impedance of the line into which energy is to be coupled. The position of the loop is so selected, or a capacitive member is utilized to provide a lumped capacitance between the loop and the inner conductor of the line, by which to equalize the inductive and capacitive couplings between the loop and the transmission line at a selected wave-signal frequency. The near end of the loop is terminated in a transmission line into which wave-signal energy is to be coupled. The magnitude of wave-signal energy coupled into the pick-up loop changes rapidly with the frequency of the translated wave signal, thus causing the coupler to be highly frequency-selective. The construction of the coupler does not lend itself readily to any reequalization of the inductive and capacitive couplings at a new frequency except possibly by rotation of the loop relative to the axis of the adjacent conductor. While one form of this prior directional coupler utilizes a construction by which the coupling loop is so rotatable, there is the disadvantage that the construction requires a rotatable joint between the outer conductors of the coupled transmission lines with consequent complexity and cost of the coupler. Also, the rotatable joint last mentioned may permit loss of wave-signal energy into outside space unless precautions are taken to prevent such loss which precautions further complicate the structure. There is the further disadvantage with this prior coupler that it is incapable of directionally coupling two oppositely traveling waves simultaneously.

It is an object of the present invention, therefore to provide a new and improved wave-signal directional coupler characterized by a very compact, simple and inexpensive construction.

It is a further object of the invention to provide a wave-signal directional coupler in which the maximum ratio of forward to backward coupling may be readily obtained by a simple adjustment, thus to decrease the initial cost of the coupler by permitting wider tolerances during the fabrication thereof and to permit such ratio to be maintained for any wave-signal frequency in a relatively wide range of operating frequencies.

In accordance with the invention, a wave-signal directional coupler comprises a pair of similar transmission lines each having at least one conductor including a bent section with a vertex portion and vertex-forming elements. The vertex portions of each of the sections are positioned in an unshielded relation to and in proximity to one another and the vertex-forming elements of one of the sections extend substantially in diametrically opposite directions from corresponding vertex-forming elements of the other section to provide a value of inductive coupling between the lines larger than the value of capacitive coupling therebetween. The coupler includes at least one capacitive coupling member positioned between the lines at the region of the bent sections thereof and adjustably movable to adjust the capacitive coupling to a value at least approximately equal to that of the inductive coupling at a selected wave-signal frequency.

For a better understanding of the present invention, together with other and further objects thereof, reference is had to the following description taken in connection with the accompanying drawing, and its scope will be pointed out in the appended claims.

Figure 2:
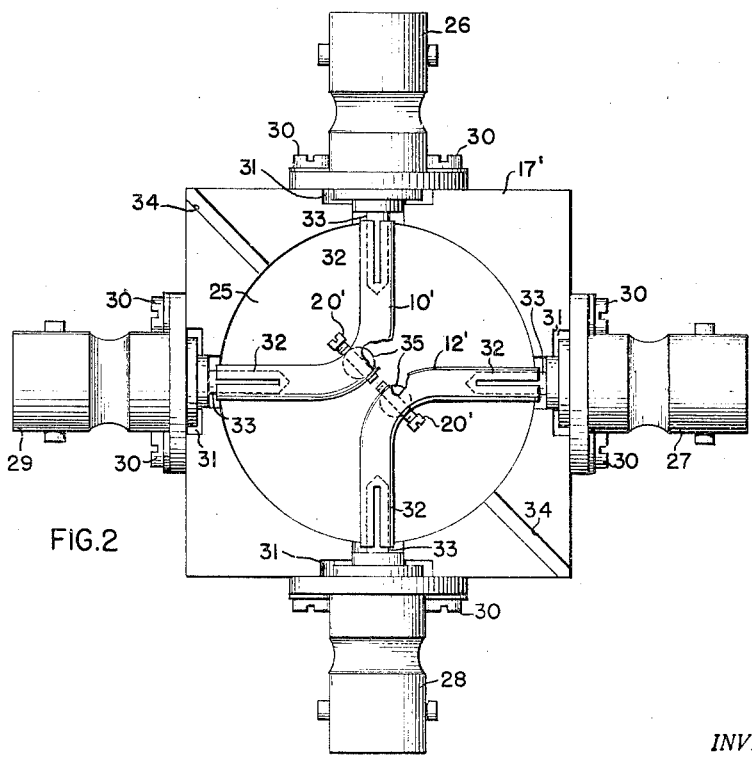

Referring to the drawing, Fig. 1 illustrates the construction of a wave-signal directional coupler embodying the present invention in a particular form; and Fig. 2 illustrates a wave-signal directional coupler embodying a modified form of the invention.

Referring now to Fig. 1 of the drawing, there is illustrated a wave-signal directional coupler embodying the present invention in a particular form. The coupler includes a pair of coaxial transmission lines 10, 11 and 12, 13. Each has the respective inner conductors 10 and 12 thereof constructed as a line section bent at a relatively sharp angle, preferably a right angle. The vertex of one such section is positioned in proximity and in an unshielded relation to that of the other but with the vertex-forming elements of the bent sections of the lines extending in opposite directions to provide a value of inductive coupling between the lines larger than the value of capacitive coupling therebetween.

As shown in connection with the line 10, 11, the end of each line may conveniently comprise one-half of a coaxial connector. For this purpose, a bushing 14 of dielectric material is utilized to maintain the line conductors in coaxial relation and the end of the inner conductor 10 is provided with a coaxial bore 15 to receive a coaxial projection provided on the end of the inner conductor of the other half of the connector. The latter member also includes a sleeve which slips over the outer conductor 11 of the line and is provided with spiral slots arranged to co-operate wtih pins 16, 16, provided on the outer conductor 11, to provide a bayonet type of connector. This type of connector is a conventional one well known in the art.

The outer conductors 11 and 13 of the lines are mechanically and electrically connected to four walls of a conductive housing 17 which encloses the bent line sections and provides the outer conductor of the lines over the lengths of the sections. A conductive corner member 18, electrically connected to the housing 17, is positioned in spaced relation to the inner conductor 10 of the line 10, 11 to maintain the characteristic impedance of the line substantially uniform along its length including the bent section thereof. A similar conductive corner member 19 is provided for the line 12, 13 for the same purpose. As thus arranged, the lines 10, 11 and 12, 13 are shielded from one another except at the bent sections thereof and the latter have a length short in relation to the wave length of a wave signal translated by the lines.

The directional coupler includes at least one capacitive coupling member positioned between the lines at the region of the bent sections and adjustably movable to adjust the capacitive coupling between the lines to a value at least approximately equal to that of the inductive coupling therebetween at a selected wave-signal frequency. This capacitive coupling member comprises a resilient strip of conductive material 20 electrically and mechanically connected to the inner conductor 12 of the line 12, 13 at the region of the bend thereof, the member 20 projecting toward but being space from the inner conductor 10 of the line 10, 11 also at the region of the bend thereof. A manually adjustable screw-threaded member 21, which may be of insulating material, extends through a corner of the housing 17 into engagement with the capacitive coupling member 20 to adjust the spacing of the latter from the inner conductor 10 of the line 10, 11.

Considering now the operation of the wave-signal directional coupler just described, assume that the end A of the transmission line 10, 11 is coupled to a wave-signal source and that the end B of this line is coupled to a wave-signal load device which terminates the line in its characteristic impedance. Wave-signal energy then flows, under the assumed conditions, through the line 10, 11 from its end A to its end B. The wave-signal current flowing along the inner conductor 10 within the housing 17 sets up a magnetic field about the conductor and this field links the inner conductor of the line 12, 13. Wave-signal energy is thereby inductively coupled from the line 10, 11 to the line 12, 13. The magnitude of this coupling is determined by the exposed lengths of the inner conductors and their spacing. The exposed lengths of the inner conductors 10 and 12 also have capacitive coupling therebetween which likewise couples wave-signal energy from the line 10, 11 to the line 12, 13.

The portions of the inner conductors 10 and 12 within the housing 17 preferably have a length and relative spacing such that a desired value of attenuation between the lines is attained and the value of inductive coupling between the lines is larger than the value of capacitive coupling therebetween. It is then the purpose of the capacitive member 20 to increase the value of the capacitive coupling between the lines. For this purpose, the manually adjustable member 21 is manipulated so to adjust the spacing of the member 20 from the line conductor 10 that the capacitive coupling has a value equal to that of the inductive coupling at the frequency of the translated wave-signal energy. When equality is thus established, wave-signal energy flowing from the terminal A to the terminal B of the line 10, 11 couples wave-signal energy into the line 12, 13 which, assuming both ends of the latter are terminated by impedances having values equal to the characteristic impedance of this line, flows through the line 12, 13 only in the direction from the terminal C to the terminal D. Wave-signal energy is thus directionally coupled from the transmission line 10, 11 to the line 12, 13.

Any wave-signal energy flowing from the terminal B to the terminal A of the line 10, 11, such as caused under an assumed condition that the load device coupled to terminal B does not terminate the line 10, 11 in its characteristic impedance, likewise induces wave-signal energy into the line 12, 13. In this case, however, the direction of energy flow for the latter wave-signal energy is from the terminal D to the terminal C of the line 12, 13.

While it was above assumed that the terminals A and B were respectively coupled to a wave-signal source and a wave-signal load device, the connections of these terminals to the source and the load device may be reversed. This effects a corresponding reversal of the directions above described in which wave-signal energy coupled into the line 12, 13 flows between the terminals C and D. Further, the wave-signal source and the wave-signal load device may be coupled to the terminals C and D of the directional coupler, in which event wave-signal energy is directionally coupled into the transmission line 10, 11 and flows therein in a direction dependent upon the direction of energy flow in the line 12, 13.

When the directional coupler has been adjusted, by adjustment of the member 21, to provide equal values of inductive and capacitive coupling between the transmission lines thereof at a selected wave-signal frequency, a substantial change of wave-signal frequency may cause the inductive and capacitive couplings to become unequal. When this occurs, it is only necessary to readjust the member 21 to restore equality of inductive and capacitive couplings at the new wave-signal frequency, thereby to restore the desired directional coupling characteristic.

It was above stated that the corner members 18 and 19 are utilized to maintain the characteristic impedances of the lines 10, 11 and 12, 13 substantially uniform along their lengths. These members may, if desired, be dispensed with and the spacing between the top and bottom sides of the housing 17 may be selected to effect the same result in well-known manner.

Fig. 2 illustrates the construction of a wave-signal directional coupler embodying the present invention in a modified form essentially similar to that of Fig. 1, similar elements being designated by similar reference numerals and analogous elements by similar reference numerals primed. The housing 17' of this coupler is formed of upper and lower blocks of solid conductive material, only the lower one of which is shown but the upper one of which is similarly constructed. Each of these blocks has a bore 25 in one face thereof, the bore of the upper and lower blocks forming a closed chamber when the blocks are in assembled relation. A plurality of coaxial connectors 26, 27, 28 and 29 are secured by machine screws 30 to one of the blocks and both blocks are milled at 31 to receive the projecting ends of the connectors. The conductors 10' and 12' have axial bores 32 at each end thereof and are slotted firmly to receive and engage the end of the inner conductor 33 of an associated coaxial connector. The adjustable capacitive members 20' of the present directional coupler comprise machine screws threaded through an individual one of the conductors 10' and 12' at the vertex thereof. Oppositely extending grooves 34, 34 are milled in the face of each block to provide holes through the assembled blocks by which a screw driver of insulating material may be inserted from without the housing 17' into the chamber 25 for adjustment of the capacitive members 20', 20'. Pedestals 35 of insulating material are secured in suitable manner to the upper and lower blocks in alignment with the conductors 10' and 12' and serve to support the latter conductors against lateral movement. The operation of this modified form of the invention is essentially similar to that described in connection with Fig. 1 and will not be repeated.

It will be apparent from the above description of the invention that a wave-signal directional coupler embodying the invention has the advantage that it involves a very compact, simple and inexpensive construction. It has the additional advantage that the values of inductive and capacitive couplings between the transmission lines thereof may be readily adjusted to equality, thus to decrease the coupler cost by permitting wider tolerances during fabrication of the coupler and to ensure the desired directional coupler operation for any wave-signal frequency within a relatively wide range of operating frequencies.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A wave-signal directional coupler comprising, a pair of similar transmission lines each having at least one conductor including a bent section with a vertex portion and vertex-forming elements, the vertex portions of each of said sections being positioned in an unshielded relation to and in proximity to one another and the vertex-forming elements of one of said sections extending substantially in diametrically opposite directions from corresponding vertex-forming elements of said other section to provide a value of inductive coupling between said lines larger than the value of capacitive coupling therebetween, and at least one capacitive coupling member positioned between said lines at the region of said bent sections and adjustably movable to adjust said capacitive coupling to a value at least approximately equal to that of said inductive coupling at a selected wave-signal frequency.

2. A wave-signal directional coupler comprising, a pair of similar transmission lines each having at least one conductor including a bent section with a sharp angle vertex portion and vertex-forming elements, the vertex portions of each of said sections being positioned in an unshielded relation to and in proximity to one another and the vertex-forming elements of one of said sections extending substantially in diametrically opposite directions from corresponding vertex-forming elements of said other section to provide a value of inductive coupling between said lines larger than the value of capacitive coupling therebetween, and at least one capacitive coupling member positioned between said lines at the region of said bent sections and adjustably movable to adjust said capacitive coupling to a value at least approximately equal to that of said inductive coupling at a selected wave-signal frequency.

3. A wave-signal directional coupler comprising, a pair of similar transmission lines each having at least one conductor including a bent section with an approximately right angle vertex portion and vertex-forming elements, the vertex portions of each of said sections being positioned in an unshielded relation to and in proximity to one another and the vertex-forming elements of one of said sections extending substantially in diametrically opposite directions from corresponding vertex-forming elements of said other section to provide a value of inductive coupling between said lines larger than the value of capacitive coupling therebetween, and at least one capacitive coupling member positioned between said lines at the region of said bent sections and adjustably movable to adjust said capacitive coupling to a value at least approximately equal to that of said inductive coupling at a selected wave-signal frequency.

4. A wave-signal directional coupler comprising, a pair of similar transmission lines each having at least one conductor including a bent section with a vertex portion and vertex-forming elements, the vertex portions of each of said sections being positioned in an unshielded relation to and in proximity to one another and the vertex-forming elements of one of said sections extending substantially in diametrically opposite directions from corresponding vertex-forming elements of said other section to provide a value of inductive coupling between said lines larger than the value of capacitive coupling therebetween, said lines being shielded from one another except at said bent sections which have a length short in relation to the wave length of a wave signal translated by said lines, and at least one capacitive coupling member positioned between said lines at the region of said bent sections and adjustably movable to adjust said capacitive coupling to a value at least approximately equal to that of said inductive coupling at a selected wave-signal frequency.

5. A wave-signal directional coupler comprising, a pair of similar transmission lines each having at least one conductor including a bent section with a vertex portion and vertex-forming elements, the vertex portions of each of said sections being positioned in an unshielded relation to and in proximity to one another and the vertex-forming elements of one of said sections extending substantially in diametrically opposite directions from corresponding vertex-forming elements of said other section to provide a value of inductive coupling between said lines larger than the value of capacitive coupling therebetween, means for maintaining the characteristic impedance of said lines substantially uniform along their lengths including said bent sections thereof, and at least one capacitive coupling member positioned between said lines at the region of said bent sections and adjustably movable to adjust said capacitive coupling to a value at least approximately equal to that of said inductive coupling at a selected wave-signal frequency.

6. A wave-signal directional coupler comprising, a pair of coaxial transmission lines each having inner and outer conductors each of said inner conductors including a bent section with a vertex portion and vertex-forming elements, the vertex portions of each of said sections being positioned in an unshielded relation to and in proximity to one another and the vertex-forming elements of one of said sections extending substantially in diametrically opposite directions from corresponding vertex-forming elements of said other section to provide a value of inductive coupling between said lines larger than the value of capacitive coupling therebetween, and at least one capacitive coupling member positioned between said inner conductors of said lines at the region of said bent sections and adjustably movable to adjust said capacitive coupling to a value at least approximately equal to that of said inductive coupling at a selected wave-signal frequency.

7. A wave-signal directional coupler comprising, a pair of similar transmission lines each having at least one conductor including a bent section with a vertex portion and vertex-forming elements, the vertex portions of each of said sections being positioned in an unshielded relation to and in proximity to one another and the vertex-forming elements of one of said sections extending substantially in diametrically opposite directions from corresponding vertex-forming elements of said other section to provide a value of inductive coupling between said lines larger than the value of capacitive coupling therebetween, a conductive housing enclosing said inner conductors and providing the outer conductor thereof over the lengths of said sections, and at least one capacitve coupling member positioned between said lines at the region of said bent sections and adjustably movable to adjust said capacitive coupling to a value at least approximately equal to that of said inductive coupling at a selected wave-signal frequency.

8. A wave-signal directional coupler comprising, a pair of similar transmission lines each having at least one conductor including a bent section with a vertex portion and vertex-forming elements, the vertex portions of each of said sections being positioned in an unshielded relation to and in proximity to one another and the vertex-forming elements of one of said sections extending substantially in diametrically opposite directions from corresponding vertex-forming elements of said other section to provide a value of inductive coupling between said lines larger than the value of capacitive coupling therebetween, a conductive housing enclosing said inner conductors to provide the outer conductor thereof over the lengths of said sections and having parameters so selected as to maintain the characteristic impedance of said lines substantially uniform along the lengths thereof which include said sections, and at least one capacitive coupling member positioned between said lines at the region of said bent sections and adjustably movable to adjust said capacitive coupling to a value at least approximately equal to that of said inductive coupling at a selected wave-signal frequency.

DAVID F. BOWMAN.

REFERENCES CITED

The following references are of record in the file of this patent:

UNITED STATES PATENTS

| Number | Name | Date |
|---|---|---|
| 2,423,416 | Sontheimer at al. | July 1, 1947 |